United States Patent
Sakai

(10) Patent No.: US 9,696,614 B2
(45) Date of Patent: Jul. 4, 2017

(54) PROJECTION OPTICAL SYSTEM AND PROJECTION-TYPE IMAGE DISPLAY DEVICE

(71) Applicant: SEIKO EPSON CORPORATION, Tokyo (JP)

(72) Inventor: Toshihiko Sakai, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 94 days.

(21) Appl. No.: 14/801,100

(22) Filed: Jul. 16, 2015

(65) Prior Publication Data
US 2016/0025954 A1    Jan. 28, 2016

(30) Foreign Application Priority Data
Jul. 28, 2014    (JP) ................. 2014-152641

(51) Int. Cl.
| G03B 21/14 | (2006.01) |
| G02B 13/16 | (2006.01) |
| G02B 27/09 | (2006.01) |
| G02B 9/64  | (2006.01) |
| G02B 7/04  | (2006.01) |
| G02B 15/14 | (2006.01) |
| G02B 5/00  | (2006.01) |

(52) U.S. Cl.
CPC ............ *G03B 21/142* (2013.01); *G02B 13/16* (2013.01); *G02B 27/0988* (2013.01); *G03B 21/14* (2013.01); *G02B 5/005* (2013.01); *G02B 7/04* (2013.01); *G02B 9/64* (2013.01); *G02B 15/14* (2013.01)

(58) Field of Classification Search
CPC ........ G02B 13/16; G02B 15/14; G02B 5/005; G02B 7/04; G02B 9/64; G02B 27/0988; G03B 21/14; G03B 21/142
See application file for complete search history.

(56) References Cited

U.S. PATENT DOCUMENTS

| 5,442,484 A | 8/1995 | Shikawa | |
| 2011/0115946 A1* | 5/2011 | Saruwatari | G02B 13/22 348/240.3 |
| 2012/0092625 A1* | 4/2012 | Minami | G02B 27/0025 353/33 |
| 2013/0027676 A1* | 1/2013 | Otani | G03B 21/142 353/97 |

FOREIGN PATENT DOCUMENTS

| JP | H06-138386 A | 5/1994 |
| JP | 2005-128217 A | 5/2005 |
| JP | 2010-243542 A | 10/2010 |
| JP | 2012-189837 A | 10/2012 |

* cited by examiner

*Primary Examiner* — Sultan Chowdhury
*Assistant Examiner* — Magda Cruz
(74) *Attorney, Agent, or Firm* — Oliff PLC

(57) ABSTRACT

A projection optical system includes: a plurality of lenses; a lens frame that holds at least one lens of the plurality of lenses; a first diaphragm provided on the light incident side of the lens frame; and a second diaphragm provided on the light exiting side of the lens frame.

8 Claims, 4 Drawing Sheets

PROJECTION OPTICAL SYSTEM AND PROJECTION-TYPE IMAGE DISPLAY DEVICE

BACKGROUND

1. Technical Field

The present invention relates to a projection optical system suitable for being incorporated into a projector that enlarges and projects an image of an image display element, and a projection-type image display device incorporating the projection optical system.

2. Related Art

In recent years, as projectors have higher luminance and higher resolution, a heat load increases on the optical path of projection light, and therefore, some projectors use a light shielding plate (diaphragm) in a projection optical system in order to, for example, deal with defocusing (e.g., refer to JP-A-2012-189837). A projection lens disclosed in JP-A-2012-189837 includes a plurality of lens groups, in which a metal diaphragm satisfying prescribed conditions such as reflectance is disposed on the exiting side of the lens group that is close to the illumination system side and on the incident side of the lens group that is next to the above-mentioned lens group and located on the screen side.

In the projection lens disclosed in JP-A-2012-189837, however, stray light impinges on an exiting-side lens frame of the group on the screen side, so that the temperature rise is expected in that portion, and in addition, the impinging of the stray light on the frame causes an increase in flare. As the projector has higher luminance, there is the possibility that the temperature of the lens frame portion may exceed the heat-resistant temperature of plastic.

SUMMARY

An advantage of some aspects of the invention is to provide a projection optical system in which stray light directly impinging on a lens frame is reduced.

Another advantage of some aspects of the invention is to provide a projection-type image display device incorporating the projection optical system.

A projection optical system according to an aspect of the invention includes: a plurality of lenses; a lens frame that holds at least one lens of the plurality of lenses; a first diaphragm provided on the light incident side of the lens frame; and a second diaphragm provided on the light exiting side of the lens frame.

According to the projection optical system, the first diaphragm blocks peripheral light rays of a light flux to be incident on the lens held by the lens frame. Due to this, light rays impinging on the lens frame can be reduced.

Although the light rays impinging on the lens frame are further reduced when the inside diameter of the lens frame is increased, there is the possibility that unwanted light rays may pass through the lens. However, since the unwanted light rays are blocked by the second diaphragm, the inside diameter of the lens frame can be increased. As a result, according to the projection optical system, the light rays impinging on the lens frame can be reduced.

In another aspect of the invention, the projection optical system further includes a lens frame support body that supports the lens frame, wherein the lens frame includes a first diaphragm support portion that supports the first diaphragm, and a coupling portion for coupling the lens frame with the lens frame support body, and as viewed from a direction parallel to an optical axis of the lens, the first diaphragm support portion and the coupling portion are provided at different positions with respect to a circumferential direction of the lens. According to this configuration, since the first diaphragm is fixed to the lens frame by means of the first diaphragm support portion, the heat resistance between the first diaphragm and the lens frame is high compared to the case where the first diaphragm is directly fixed to the lens frame. Therefore, heat conducting from the first diaphragm to the lens frame can be reduced. Moreover, since the first diaphragm support portion and the coupling portion are shifted in position, the heat resistance between the first diaphragm and the lens frame support body is high compared to the case where the first diaphragm support portion and the coupling portion are not shifted in position. Therefore, heat conducting from the first diaphragm to the lens frame support body can be reduced.

In still another aspect of the invention, the projection optical system further includes a lens frame support body that supports the lens frame, wherein the lens frame includes a second diaphragm support portion that supports the second diaphragm, and a coupling portion for coupling the lens frame with the lens frame support body, and as viewed from a direction parallel to an optical axis of the lens, the second diaphragm support portion and the coupling portion are provided at different positions with respect to a circumferential direction of the lens. According to this configuration, since the second diaphragm is fixed to the lens frame by means of the second diaphragm support portion, the heat resistance between the second diaphragm and the lens frame is high compared to the case where the second diaphragm is directly fixed to the lens frame. Therefore, heat conducting from the second diaphragm to the lens frame can be reduced. Moreover, since the second diaphragm support portion and the coupling portion are shifted in position, the heat resistance between the second diaphragm and the lens frame support body is high compared to the case where the second diaphragm support portion and the coupling portion are not shifted in position. Therefore, heat conducting from the second diaphragm to the lens frame support body can be reduced.

In yet another aspect of the invention, an inside diameter of an aperture of the lens frame on the light exiting side is larger than an effective diameter of the at least one lens, an inside diameter of an aperture of the first diaphragm is smaller than an inside diameter of an aperture of the lens frame on the light incident side, and an inside diameter of an aperture of the second diaphragm is smaller than the inside diameter of the aperture of the lens frame on the light exiting side. In this case, the outside diameter of the lens is increased, and also, the inside diameter of the aperture of the lens frame is increased, so that the impinging of light on the lens frame can be reduced. On the other hand, when the outside diameter of the lens is increased, unwanted light rays may pass through the lens to increase flare. However, since the unwanted light rays are blocked by the second diaphragm, the increase in flare can be reduced. Therefore, the amount of light impinging on the lens frame can be effectively reduced.

In still yet another aspect of the invention, at least one of the first diaphragm and the second diaphragm is spaced from the lens frame. For example, when the first diaphragm is spaced from the lens frame, the temperature rise of the lens frame can be reduced on the light incident side where incident light is relatively strong and the amount of heat generation tends to be large.

In further another aspect of the invention, the plurality of lenses have a zoom function. In this case, since the state of light incident on the lens that moves with variation in magnification is changed, the providing of the diaphragm is highly significant.

In still further another aspect of the invention, at least one of the first diaphragm and the second diaphragm is made of metal. In this case, the diaphragm made of metal has favorable temperature uniformity and heat dissipation property, so that the temperature rise of the diaphragm can be reduced. Here, there are no particular limitations on the reflectance of the diaphragm made of metal. Therefore, the diaphragm may be, for example, black. When the reflectance of the diaphragm is high, the temperature rise of the diaphragm can be reduced; while when the reflectance of the diaphragm is low, stray light can be further reduced.

In yet further another aspect of the invention, at least one of the first diaphragm and the second diaphragm is fixed to the lens frame by means of a heat-resistant fixing member. In this case, it is possible to stably support the diaphragm while reducing heat conducting from the diaphragm to the lens frame.

A projection-type image display device according to still yet further another aspect of the invention includes: the projection optical system described above; and an image forming optical unit provided upstream of the projection optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projection optical system and a projection-type image display device incorporating the projection optical system according to an embodiment of the invention will be described in detail with reference to the drawings.

Figure 1:
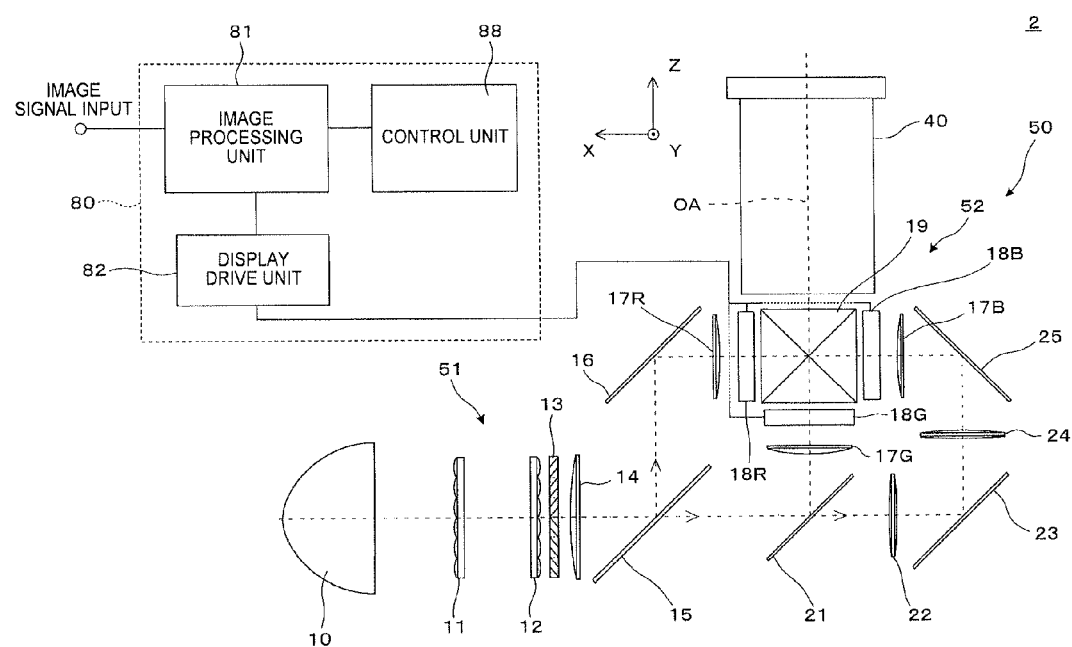
FIG. 1 shows a schematic configuration of a projection-type image display device incorporating a projection optical system of an embodiment.

As shown in FIG. 1, a projector 2 as the projection-type image display device incorporating the projection optical system according to the embodiment of the invention includes an optical system portion 50 that projects image light and a circuit device 80 that controls the operation of the optical system portion 50.

In the optical system portion 50, a light source 10 is composed of, for example, an extra-high-pressure mercury lamp, a solid-state light source, or the like. Each of a first integrator lens 11 and a second integrator lens 12 includes a plurality of lens elements arranged in an array. The first integrator lens 11 divides a light flux from the light source 10 into a plurality of partial light fluxes, and also condenses the respective partial light fluxes near the lens elements of the second integrator lens 12. The lens elements of the second integrator lens 12 form, in cooperation with a superimposing lens 14, images of the lens elements of the first integrator lens 11 on a liquid crystal panel 18R, a liquid crystal panel 18G, and a liquid crystal panel 18B described later.

A polarization conversion element 13 converts the light coming from the second integrator lens 12 into predetermined linearly polarized light. The superimposing lens 14 superimposes, in cooperation with the second integrator lens 12, the images of the lens elements of the first integrator lens 11 on each other on display areas of the liquid crystal panel 18R, the liquid crystal panel 18G, and the liquid crystal panel 18B.

A first dichroic mirror 15' reflects red light (R light) incident through the superimposing lens 14 and transmits green light (G light) and blue light (B light) therethrough. The R light reflected by the first dichroic mirror 15 passes through a reflection mirror 16 and a field lens 17R, and is incident on the liquid crystal panel 18R as a display element. The liquid crystal panel 18R modulates the R light in response to an image signal to thereby form a red image.

A second dichroic mirror 21 reflects the G light coming from the first dichroic mirror 15 and transmits the B light therethrough. The G light reflected by the second dichroic mirror 21 passes through a field lens 17G and is incident on the liquid crystal panel 18G as a display element. The liquid crystal panel 18G modulates the G light in response to an image signal to thereby form a green image. The B light transmitted through the second dichroic mirror 21 passes through a relay lens 22, a reflection mirror 23, a relay lens 24, a reflection mirror 25, and a field lens 17B, and is incident on the liquid crystal panel 18B as a display element. The liquid crystal panel 18B modulates the B light in response to an image signal to thereby form a blue image.

Across dichroic prism 19 is a light combining prism, which combines the lights modulated by the liquid crystal panels 18R, 18G, and 18B to form image light and causes the image light to travel to a projection lens 40 including a plurality of lenses.

The projection lens 40 enlarges and projects the image light modulated by the liquid crystal panels 18G, 18R, and 18B and combined by the cross dichroic prism 19 onto a screen (not shown).

In the optical system portion 50 described above, the cross dichroic prism 19 and the projection lens 40 constitute a projection optical system 52 for enlarging and projecting an image formed by the liquid crystal panels 18R, 18G, and 18B onto the screen. The projection lens 40 can function alone as the projection optical system 52, and therefore, the projection lens 40 alone may be referred to as a projection optical system. The liquid crystal panels 18G, 18R, and 18B, the dichroic mirrors 15 and 21, the polarization conversion element 13, the integrator lenses 11 and 12, the light source 10, and the like, which are provided upstream of the optical path of the projection optical system 52 described above, function as an image forming optical unit 51.

The circuit device 80 includes: an image processing unit 81 to which an external image signal such as a video signal is input; a display drive unit 82 that drives, based on output of the image processing unit 81, the liquid crystal panels 18G, 18R, and 18B provided in the optical system portion 50; and a control unit 88 that collectively controls the operations of the image processing unit 81 and the display drive unit 82.

The image processing unit 81 converts the input external image signal into an image signal including gray scales and the like of the respective colors. The image processing unit 81 can perform various kinds of image processing such as distortion correction and color correction on the external image signal.

The display drive unit 82 can cause the liquid crystal panels 18G, 18R, and 18B to operate based on the image signal output from the image processing unit 81, and can cause the liquid crystal panels 18G, 18R, and 18B to form an image corresponding to the image signal or an image corresponding to the image signal after being subjected to image processing.

Figure 2:
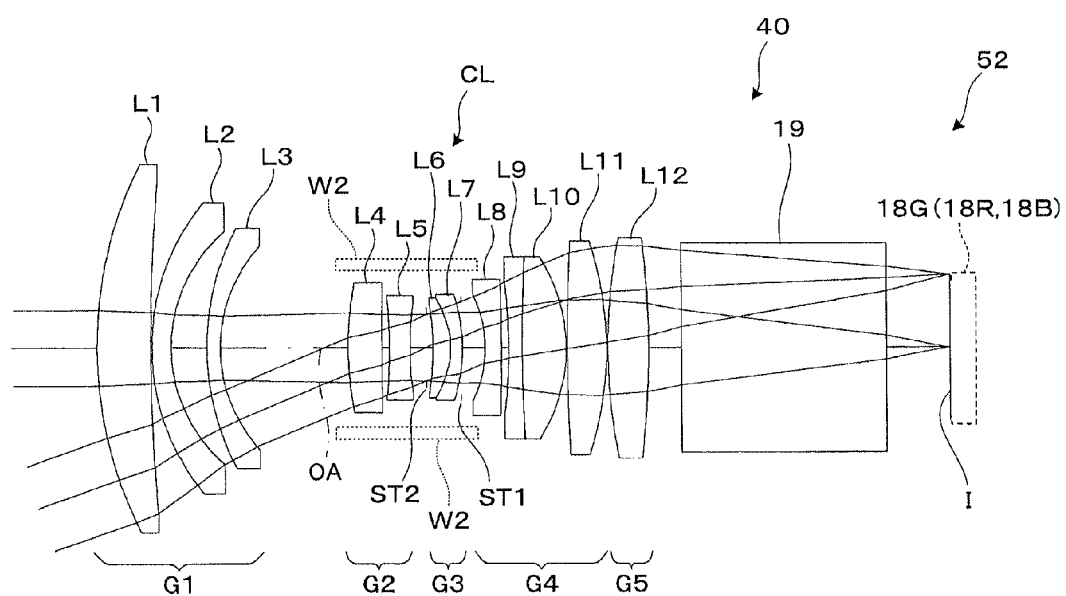
FIG. 2 is a cross-sectional view for explaining the projection optical system of the projection-type image display device in FIG. 1.

With reference to FIG. 2, the projection lens 40 and the projection optical system 52 according to the embodiment of the invention will be specifically described below.

In the embodiment, the projection lens 40 includes, in order from the enlargement side (i.e., the screen side), a front lens group G1, zoom lens groups G2, G3, and G4, and a rear lens group G5. That is, the projection lens 40 has a zoom function. The front lens group G1 is composed of lenses L1, L2, and L3. The zoom lens group G2 is composed of lenses L4 and L5. The zoom lens group G3 is composed of lenses L6 and L7. The zoom lens group G4 is composed of lenses L8 to L11. The rear lens group G5 is composed of a lens L12. The lenses L1 to L12 are formed of, for example, glass or plastic. In the projection lens 40, when the magnification is varied, the front lens group G1 closest to the enlargement side and the rear lens group G5 closest to the reduction side are fixed, and a portion or all of the zoom lens groups G2, G3, and G4 between the lens groups G1 and G5 are individually moved along an optical axis OA. That is, each of the zoom lens groups G2, G3, and G4 is composed of one lens or a combination of two or more lenses, and a frame of the lens is coupled with a cam barrel W2 via a lens barrel (not shown) in a group unit. The groups are each guided, through the operation of a drive unit 91 of a drive mechanism 90 shown in FIG. 3A, by slits (not shown) provided in the cam barrel W2, and move independently of each other along the optical axis OA. When a focus is achieved, a lens or a lens group on the enlargement side in the front lens group G1 is moved alone along the optical axis OA.

Figure 3A:
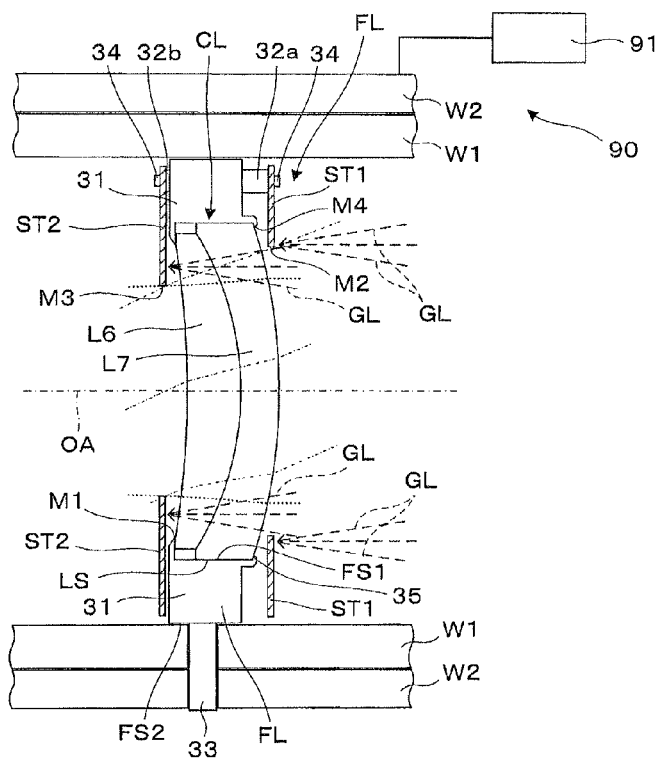
FIG. 3A is a cross-sectional view for explaining surroundings of a lens including diaphragms on the incident and exiting sides of the lens.
Figure 3B:
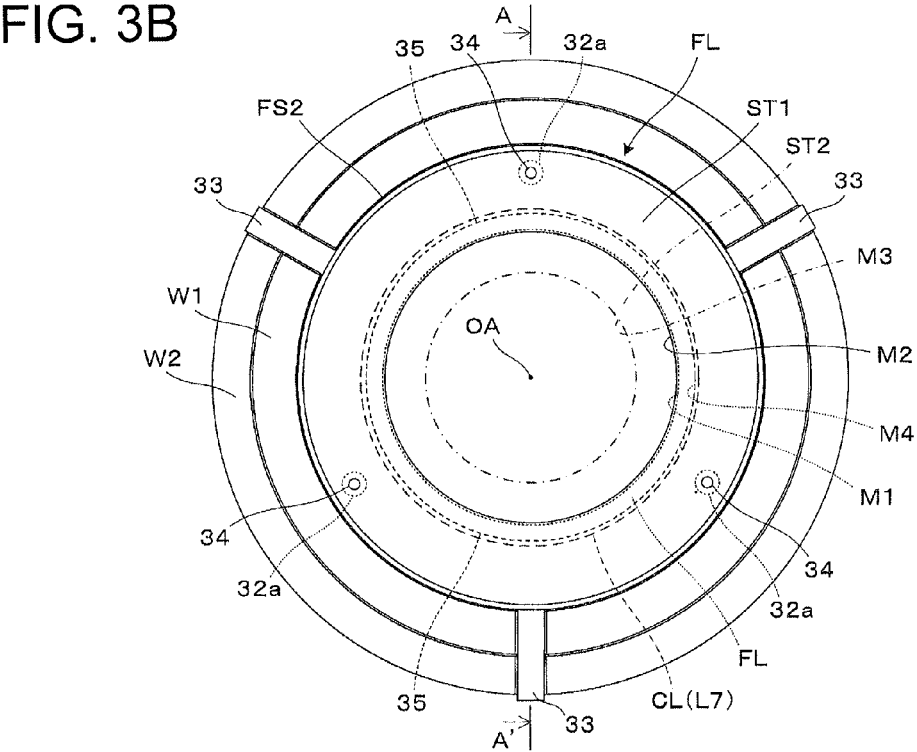
FIG. 3B is a plan view of FIG. 3A as viewed from the incident side.

As shown in FIGS. 3A and 3B, the zoom lens group G3 includes a first diaphragm ST1 and a second diaphragm ST2 located respectively on the light incident side and light exiting side of a lens frame FL that holds the lenses L6 and L7. Here, FIG. 3A is a cross-sectional view taken along A-A' in FIG. 3B. Hereinafter, a combined lens of the lens L6 and the lens L7 is referred to as a lens CL. The lens CL is a cemented lens combining the lenses L6 and L7 together. That is, the first and second diaphragms ST1 and ST2 are disposed on both sides of the lens CL as a movable unit. Since a light ray incident through an incident surface of the lens CL and a light ray exiting through an exiting surface thereof are regulated by the diaphragms ST1 and ST2, respectively, so as to have respective original diameters, flare is less likely to increase.

The lens frame FL includes a frame main body 31, a plurality of first diaphragm support portions 32a, a plurality of second diaphragm support portions 32b, a plurality of cam rollers 33, an aperture M1 on the light exiting side, and an aperture M4 on the light incident side. The cam roller 33 corresponds to a coupling portion in the appended claims. The first and second diaphragms ST1 and ST2 are supported by the plurality of first diaphragm support portions 32a and the plurality of second diaphragm support portions 32b, respectively. The cam roller 33 is provided at three locations at intervals of 120° in the circumferential direction of the frame main body 31 of the lens frame FL. The cam roller 33 projects from an outside surface FS2 of the frame main body 31. The lens frame FL is accommodated in a lens barrel W1. The cam barrel W2 is mounted outside the lens barrel W1. Although not shown in the drawings, a plurality of linear first slits parallel to the optical axis OA are provided in the lens barrel W1 so as to correspond to the plurality of cam rollers 33. Moreover, although not shown in the drawings, a plurality of second slits intersecting the optical axis OA are provided in the cam barrel W2 so as to correspond to the plurality of cam rollers 33. One cam roller 33 penetrates the corresponding first slit of the lens barrel W1 and is further inserted into the corresponding second slit of the cam barrel W2. In this manner, the lens frame FL is coupled with the lens barrel W1 and the cam barrel W2 via the cam rollers 33 so as to be able to move along the optical axis OA. When the magnification of the projection lens 40 is varied, the cam barrel W2 is rotated about the optical axis OA to thereby move the lens frame FL along the optical axis OA. In the embodiment, at least one of the lens barrel W1 and the cam barrel W2 corresponds to a lens frame support body in the appended claims. When the lens CL does not need to move and the lens frame FL is not coupled with the cam barrel W2, the lens barrel W1 corresponds to the lens frame support body.

The lens frame FL supports at an inside surface FS1 a side surface LS of the lens CL. The inside diameter of the aperture M1 of the lens frame FL is smaller than the diameter of the inside surface FS1 of the lens frame FL. The inside diameter of the aperture M1 of the lens frame FL is larger than the effective diameter of the lens CL. The outside diameter of the lens L7 and the inside diameter of the aperture M4 of the lens frame FL are larger than the inside diameter of an aperture M2 of the first diaphragm ST1, and the outside diameter of the lens L6 and the inside diameter of the aperture M1 of the lens frame FL are larger than the inside diameter of an aperture M3 of the second diaphragm ST2. Therefore, stray light GL is less likely to directly impinge on the lens frame FL. Here, the effective diameter means the range of a lens surface through which a light flux to be focused on an image forming surface I (refer to FIG. 2) of the display element passes.

Figure 4A:
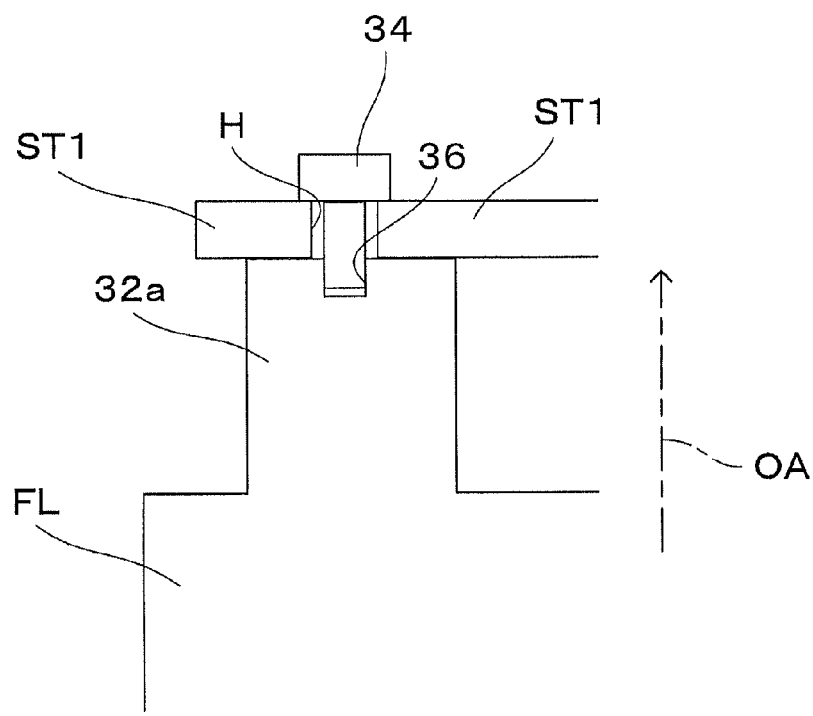
FIGS. 4A and 4B are partially enlarged cross-sectional views for explaining a lens frame and the diaphragms of the surroundings of the lens in FIG. 3A.

In the embodiment, the first diaphragm support portion 32a is provided at three locations at intervals of 120° along the circumference of the frame main body 31. That is, the first diaphragm ST1 is fixed to the lens frame FL with three-point support. As shown in FIG. 4A in an enlarged manner, the first diaphragm support portion 32a is provided so as to project in a direction (the thickness direction of the lens frame FL) along the optical axis OA. Therefore, the first diaphragm ST1 is not in contact with the lens frame FL at portions other than the first diaphragm support portions 32a of the lens frame FL. That is, as viewed from a direction vertical to the optical axis OA of the lens CL, the first diaphragm ST1 and the lens frame FL are spaced from each other. By fixing the first diaphragm ST1 to the lens frame FL via the first diaphragm support portions 32a, the heat resistance between the first diaphragm ST1 and the lens frame FL can be increased. Therefore, heat conducting from the first diaphragm ST1 via the first diaphragm support portion 32a to the lens frame FL can be reduced. Further, deformation of the lens frame FL due to heat can be reduced.

Figure 4B:
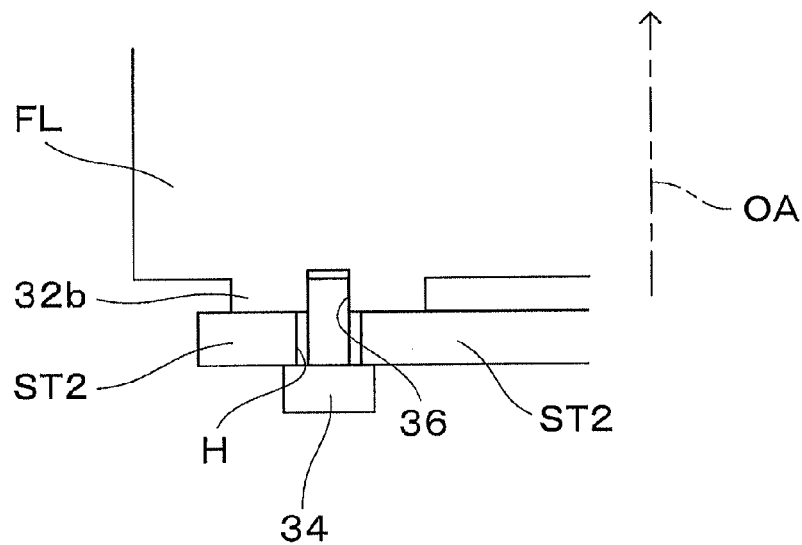

The second diaphragm support portion 32b is provided at three locations at intervals of 120° along the circumference of the frame main body 31. That is, the second diaphragm ST2 is fixed to the lens frame FL with three-point support. As shown in FIG. 4B in an enlarged manner, the second diaphragm support portion 32b is provided so as to project in the direction (the thickness direction of the lens frame FL)

along the optical axis OA. Therefore, the second diaphragm ST2 is not in contact with the lens frame FL at portions other than the second diaphragm support portions 32b of the lens frame FL. That is, as viewed from the direction vertical to the optical axis OA of the lens CL, the second diaphragm ST2 and the lens frame FL are spaced from each other. By fixing the second diaphragm ST2 to the lens frame FL via the second diaphragm support portions 32b, the heat resistance between the second diaphragm ST2 and the lens frame FL can be increased. Therefore, heat conducting from the second diaphragm ST2 via the second diaphragm support portions 32b to the lens frame FL can be reduced. Further, deformation of the lens frame FL due to heat can be reduced.

As viewed from a direction parallel to the optical axis OA of the lens CL, the first diaphragm support portions 32a and the second diaphragm support portions 32b are provided at positions different from the cam rollers 33 with respect to the circumferential direction of the lens CL. In the embodiment, the first diaphragm support portion 32a and the second diaphragm support portion 32b are provided at positions shifted from the cam roller 33 by 60° with respect to the circumferential direction. Due to this, the heat resistance between the first diaphragm ST1 and the cam barrel W2 and the heat resistance between the second diaphragm ST2 and the cam barrel W2 can be increased. Therefore, heat conducting from the first and second diaphragms ST1 and ST2 via the lens frame FL to the cam barrel W2 can be reduced.

The lens frame FL is formed of plastic. The frame main body 31 and the cam rollers 33 are integrally formed. Alternatively, the frame main body 31 and the cam rollers 33 may be separately formed, and the cam rollers 33 may be fixed to the frame main body 31 with screws or the like. A peripheral portion of the lens CL is locked with the lens frame FL by means of a crimping portion 35. The innermost circumference of the crimping portion 35 is the aperture M4 of the lens frame FL on the light incident side. The crimping portion 35 is formed using heat or the like after the lens CL is incorporated into the lens frame FL.

The first diaphragm ST1 has the aperture M2. The inside diameter of the aperture M2 is smaller than the inside diameter of the aperture M4 of the lens frame FL. The first diaphragm ST1 is fixed at the first diaphragm support portions 32a on the light incident side of the lens frame FL using heat-resistant fixing members such as screws 34. In the first diaphragm ST1, holes H through which the screws 34 pass are formed. In the first diaphragm support portion 32a, a screw hole 36 into which the screw 34 is screwed or tightened is formed.

The second diaphragm ST2 has the aperture M3. The inside diameter of the aperture M3 is smaller than the inside diameter of the aperture M1 of the lens frame FL. The second diaphragm ST2 is fixed at the second diaphragm support portions 32b on the light exiting side of the lens frame FL using heat-resistant fixing members such as the screws 34. In the second diaphragm ST2, holes H through which the screws 34 pass are formed. In the second diaphragm support portion 32b, a screw hole 36 into which the screw 34 is screwed or tightened is formed.

The first and second diaphragms ST1 and ST2 are formed of metal and thus have a favorable heat dissipation property, so that the temperature rise can be reduced. Here, there are no limitations on the reflectance of the first and second diaphragms ST1 and ST2, and the first and second diaphragms ST1 and ST2 may be, for example, black. When the reflectance of the first diaphragm ST1 is high, the temperature rise of the first diaphragm ST1 can be reduced; and when the reflectance of the second diaphragm ST2 is high, the temperature rise of the second diaphragm ST2 can be reduced. When at least one of the reflectance of the first diaphragm ST1 and the reflectance of the second diaphragm ST2 is low, stray light can be further reduced. The first and second diaphragms. ST1 and ST2 have an annular shape as viewed from the direction parallel to the optical axis OA. At least one of the first diaphragm ST1 and the second diaphragm ST2 may be provided with a heat sink to assist heat dissipation.

According to the projection optical system 52 described above, the first diaphragm ST1 blocks peripheral light rays of the light flux to be incident on the lens CL held by the lens frame FL. Due to this, light rays impinging on the lens frame FL can be reduced.

Although the light rays impinging on the lens frame FL are further reduced when the inside diameter of the lens frame FL is increased, there is the possibility that unwanted light rays may pass through the lens CL to cause flare. However, since the unwanted light rays are blocked by the second diaphragm ST2, an increase in flare can be reduced. Hence, the inside diameter of the lens frame FL can be increased. As a result, according to the projection optical system 52, the light rays impinging on the lens frame FL can be reduced, whereby it is possible to reduce the increase in flare while reducing the temperature rise of the lens frame FL.

Moreover, since the temperature rise of the lens frame FL can be reduced, the lens frame FL made of plastic can be used. Due to this, mass production is possible while suppressing the cost of the lens frame FL. Moreover, the lens frame FL made of plastic can surely hold the lens CL with the crimping portion 35.

When only the outside diameter of the lens CL is increased so as to prevent the impinging of the stray light GL, the flare may increase. However, by disposing the second diaphragm ST2 on the exiting side of the lens CL, the light flux emitted through the lens CL is regulated so as to have an original diameter, so that the increase in flare is prevented. That is, when the diaphragm is provided only on the incident side of the lens CL, it is difficult to preferably regulate a light ray to be incident on the lens CL, so that the stray light causes the flare.

The invention is not limited to the embodiment but can be implemented in various modes within the range not departing from the gist thereof.

For example, the lens configuration of the projection lens 40 is illustrative only in the embodiment, and can be appropriately changed. The number of lenses constituting the lens CL of a movable type may be one or more than one.

The projection lens 40 may not be a zoom lens in the embodiment.

The fixing members to fix the first and second diaphragms ST1 and ST2 are not limited to the screws 34 in the embodiment. It is sufficient for the fixing member to be a heat-resistant member, and for example, the fixing member may be a heat-resistant adhesive.

The first diaphragm ST1 and the second diaphragm ST2 are not necessarily spaced from the lens frame FL in the embodiment. Only one of the first and second diaphragms ST1 and ST2 may be spaced from the lens frame FL.

Moreover, only one of the first and second diaphragms ST1 and ST2 may be formed of metal in the embodiment.

Although an image is formed by the liquid crystal panel in the embodiment, the invention is not limited thereto. An image may be formed by a light modulation element such as a digital micromirror device.

The entire disclosure of Japanese Patent Application No. 2014-152641, filed Jul. 28, 2014 is expressly incorporated by reference herein.

What is claimed is:

1. A projection optical system comprising:
   a plurality of lenses;
   a lens frame that holds at least one lens of the plurality of lenses;
   a first diaphragm provided on the light incident side of the lens frame; and
   a second diaphragm provided on the light exiting side of the lens frame, wherein
   an inside diameter of an aperture of the lens frame on the light exiting side is larger than an effective diameter of the at least one lens,
   an inside diameter of an aperture of the first diaphragm is smaller than an inside diameter of an aperture of the lens frame on the light incident side, and
   an inside diameter of an aperture of the second diaphragm is smaller than the inside diameter of the aperture of the lens frame on the light exiting side.

2. The projection optical system according to claim 1, further comprising a lens frame support body that supports the lens frame, wherein
   the lens frame includes a first diaphragm support portion that supports the first diaphragm, and a coupling portion for coupling the lens frame with the lens frame support body, and
   as viewed from a direction parallel to an optical axis of the lens, the first diaphragm support portion and the coupling portion are provided at different positions with respect to a circumferential direction of the lens.

3. The projection optical system according to claim 1, further comprising a lens frame support body that supports the lens frame, wherein
   the lens frame includes a second diaphragm support portion that supports the second diaphragm, and a coupling portion for coupling the lens frame with the lens frame support body, and
   as viewed from a direction parallel to an optical axis of the lens, the second diaphragm support portion and the coupling portion are provided at different positions with respect to a circumferential direction of the lens.

4. The projection optical system according to claim 1, wherein
   at least one of the first diaphragm and the second diaphragm is spaced from the lens frame.

5. The projection optical system according to claim 1, wherein
   the plurality of lenses have a zoom function.

6. The projection optical system according to claim 1, wherein
   at least one of the first diaphragm and the second diaphragm is made of metal.

7. The projection optical system according to claim 1, wherein
   at least one of the first diaphragm and the second diaphragm is fixed to the lens frame by means of a heat-resistant fixing member.

8. A projection-type image display device comprising:
   the projection optical system according to claim 1; and
   an image forming optical unit provided upstream of the projection optical system.

* * * * *